United States Patent Office 3,404,192
Patented Oct. 1, 1968

3,404,192
PROCESS FOR SELECTIVE HYDROGENATION OF OLEFINS WITH DEACTIVATED ZEOLITE CATALYST
Stephen M. Kovach, Highland, Ind., assignor to Sinclair Research, Inc., Wilmington, Del., a corporation of Delaware
No Drawing. Filed Mar. 7, 1962, Ser. No. 177,989
5 Claims. (Cl. 260—676)

This invention relates to a process for the hydrogenation of straight chain olefins. Particularly, the present invention relates to the selective hydrogenation of straight-chain olefins in the presence of non-straight chain hydrocarbon components. More particularly, the present invention relates to the selective hydrogenation of straight chain olefins carried out in the presence of a hydrogenating catalyst consisting essentially of a partially deactivated hydrogenation component on a crystalline zeolite type catalytic support.

The present invention provides a process which preferentially hydrogenates normal olefins from a hydrocarbon mixture or petroleum charge stock containing normal aliphatic hydrocarbon, isoaliphatic hydrocarbon and cyclic hydrocarbon components to the substantial exclusion of hydrogenating said isoaliphatic, including branched olefins, and cyclic hydrocarbon components. Normal paraffins find use as intermediates for raw materials in the production of many petrochemical compounds and solvents. While normal paraffins are not particularly desirable as a motor fuel, because of their relatively low octane numbers, they may be readily isomerizable to isoparaffins which have substantially higher octane number.

In accordance with the process of this invention, the charge stock which may initially contain normal aliphatic, isoaliphatic and cyclic hydrocarbons is introduced into a catalytic hydrogenation zone containining as a catalyst a crystalline zeolite having rigid three dimensional networks bearing catalytic surfaces active in hydrocarbon hydrogenation and having uniform interstitial dimensions sufficiently large to adsorb normal aliphatic components contained in the charge but sufficiently small to substantially exclude the hydrocarbon components of larger molecular size, i.e., isoaliphatic and cyclic hydrocarbons. Under such conditions, the normal olefins of the normal aliphatic hydrocarbon components, i.e., normal olefins and normal paraffins of the charge mixture capable of entering the interior pore structure of the above catalyst, undergo hydrogenation.

The base of the hydrogenation catalyst comprises a crystalline synthetic or natural zeolite having a uniform pore size which permits passage of normal aliphatic hydrocarbons but excludes larger molecular size components. It is preferred to use as the base a synthetic zeolite having uniform pore dimensions of about 5 angstrom units made by dehydrating a synthetic metal aluminosilicate salt. The resulting dehydrated crystalline zeolites have the atoms thereof arranged in a definite crystalline pattern. Such structure contains a large number of small cavities interconnected by a number of still smaller channels. These cavities and channels are precisely uniform in size. It is essential for the present process that the zeolite catalyst have a uniform pore structure permitting entry into the interior thereof of normal aliphatic hydrocarbons but excluding entry of isoaliphatic hydrocarbons, cyclic hydrocarbons and other components characterized by a molecular size greater than that of normal aliphatics. Generally, a catalyst fulfilling the above requirements has a uniform pore size of about 5 angstrom units. Thus, if the pore size is materially smaller than 5 angstrom units, the pores are too small to permit entry into the crystalline catalyst structure of normal aliphatics. If the pores are materially larger, the large hydrocarbon molecules, i.e., isoaliphatics and cyclic hydrocarbons are able to enter the pores of the catalyst structure so that selective hydrogenation of the normal olefins of the normal aliphatic components cannot thereby be achieved.

Zeolites vary somewhat in composition but generally contain the elements silicon, aluminum and oxygen as well as an alkali metal and/or an alkaline earth metal element, e.g., sodium and/or calcium. The naturally occurring zeolite analcite, for instance, has the empirical formula $NaAlSi_2O_4 \cdot H_2O$. It is preferred, however, to employ as the selective adsorbent a synthetic molecular sieve zeolite manufactured by Linde Air Products Company and designated in the trade as Linde Type 5A molecular sieve. The crystals of this particular calcium aluminosilicate have a pore size or diameter of about 5 anstrom units, such pore size being sufficiently large to admit straight chain hydrocarbons such as normal paraffins and normal olefins to the substantial exclusion of the non-straight chain naphthenic, aromatic, isoparaffinic and isoolefinic hydrocarbons.

A wide variety of hydrogenation components may be used. The metal component or components may be selected from the group consisting of catalytic metals and metal oxides of Groups VI(B) and VIII of the Periodic Table, e.g., chromium, molybdenum, tungsten, platinum, rhodium, cobalt, nickel and ruthenium and combinations of the same such as for instance, the oxides of cobalt or molybdenum in admixture and including cobalt molybdate. The preferred hydrogenating component is platinum or other platinum group metal. The amount of the catalytically active hydrogenating component deposited on the crystalline zeolite may be in the range of about 0.01 to 10 percent by weight, preferably in the range of 0.1 to 1 percent by weight based on the weight of the catalyst.

In the preparation of the catalytically active catalyst of this invention it is essential that the catalytic agent be substantially uniformly diffused throughout the zeolite crystalline structure so that the cavities and channels are substantially coated with the hydrogenation component. In the activation of the zeolite material with a dispersion of the hydrogenating component which will be adsorbed by the sieve, the dispersion should be inert toward the crystalline material. The dispersion can be a true solution, e.g. hydrated chromium nitrate in water or chloroplatinic acid, or a colloidal dispersion. Furthermore, the impregnating medium advantageously should not contain appreciable amounts of alkali or alkaline earth metal compounds lest base exchange occur between the metal moiety of such alkali and the materials making up a fraction of the zeolite material. Suitable catalyst-providing materials are water soluble compounds which have a molecular size equal to or less than about 5 A. in order to penetrate into the pores of the zeolite base. The activated zeolite is preferably calcined in the presence of air or oxygen in order to remove adsorbed water from the finished catalytic material usually at a temperature from about 750 to 1200° F. or more. It is preferred when the activating metal is platinum that the metal chloride buffered with ammonia have a pH between about 7.5 and 9. Suitable liquid vehicles for depositing the catalyst-providing material onto the crystalline structure are water and a lower primary aliphatic alcohol of 1 to 4 carbon atoms. Water is the preferred liquid vehicle for efficiency and economy in the practice of our process, but a liquid vehicle which does not create much ionization of the catalyst-providing material is also attractive because there is less likelihood of blocking the fine pores of the mineral sorbent with a dispersion of catalyst-providing material in the manufacturing operation. Solutions of non-ionizing or only weakly ionizing metalliferous catalytic agent, or colloidal dispersions of the agent may also be used.

Alternatively, the catalytic agent can be substantially uniformly diffused throughout the zeolite structure by forming into larger bodies a plurality of finely divided zeolite particles which have been impregnated or otherwise coated with the activating catalytic agent. The activated zeolite structure may be made up in the form of cylindrical pellets, spheres, beads or irregular shapes from about 1/18" to 5/8" diameter in the upper size range down to 100–300 mesh sieve size in the lower range. The larger size range is preferred in the operation of the present invention.

It is necessary in the practice of the present invention that the catalytically active hydrogenation component which has been deposited on the outer surface of the crystalline zeolite be substantially deactivated below the activity limits desirable for the catalyst outer surface in the hydrogenation process by contact with a hydrogenation deactivating compound, i.e., a compound capable of substantially deactivating the catalytically active hydrogenation component. The deactivating compound is to be of such molecular size that it will not be adsorbed into the pores of the zeolite structure, i.e. the deactivating compound should have a molecular size generally greater than about 5 A.

It has been found that if the active hydrogenation component which has been deposited on the surface of the zeolite structure is not substantially deactivated, low selectivity in the hydrogenation of the normal olefins over the branched chains olefins occurs due to the presence of the catalytically active component in contact with the excluded branch chain olefins. However, if the surface component is deactivated without substantially affecting the activity of the hydrogenation component in the zeolite pore structure, the selectivity of the catalyst is greatly increased toward the hydrogenation of normal olefins over that of the branched chain olefins. Therefore, it is essential that the deactivating compound has a molecular size greater than the pores of the zeolite structure so as not to be able to enter the pore structure and deactivate the active hydrogenation component in the pore structure.

A deactivated catalyst can be described as one which has lost about 20 to 80 percent of its virgin activity. Although the exact reason for this deactivation is not known it is believed to occur as a result of some processing upset such as for example, the presence of sulfur or sulfur-containing compounds, nitrogen or nitrogen-containing compounds, heavier hydrocarbons, carbon, or aromatics in the feed materials or the presence of oxygen-containing compounds to cause poisoning of the catalytically active component. The activated catalyst may also be directly contacted with a deactivating compound prior to treating the feed material. Sulfur and nitrogen-containing deactivating compounds may include for instance, the heterocyclic compounds of sulfur and nitrogen and their derivatives. Examples of these compounds include for instance, the five-membered ring compounds, i.e. thiophene, pyrrole, isoxazole, oxazole, thiazole, pyrazole and imidazole; six-membered ring compounds, i.e. thiopyran and pyridine; etc. Non-cyclic sulfur and nitrogen containing compounds such as for instance, mercaptans, sulfides, amines, amino alcohols, etc. may also be used so long as they are not adsorbed in the pores of the zeolite structure and they substantially deactivate the catalytically active hydrogenation component.

The use of a particular deactivating compound will depend upon the metal to be deactivated, e.g., platinum can be easily deactivated with a sulfur containing compound such as for instance thiophene; whereas nickel and cobalt are not as easily deactivated with a sulfur containing compound as with a nitrogen containing compound such as for instance pyridine or quinoline. The proper selection of a deactivating compound will be obvious to those skilled in the art. Generally, the deactivating compound is present in an amount sufficient to substantially deactivate the catalytically active component on the surface of the zeolite structure but should not be present in such an excess that vaporous products viz. $H_2S$ and $NH_3$ are given off which may be adsorbed by the zeolite and deactivate the catalytically active component within the pores of the structure. Therefore, the deactivating compound or component is generally present in amounts ranging from about 0.2 to 2 gram equivalents of deactivating compound per gram equivalent of activating metal, preferably 0.25 to 1 gram equivalents. Gram equivalents being the weight of compound which contains 1 equivalent weight of hydrogen.

The catalytically acive zeolite may be either pretreated with the deactivating compound or the deactivating compound may be present in the feedstock. The deactivation of the hydrogenation activating component may be brought about at temperatures generally in the range from about room temperature up to about 500° F. or more, for instance when the active catalyst is calcined in air and reduced in the presence of hydrogen, the preferred deactivation temperature is about 100 to 500° F. If, however, the active catalyst is pre-reduced, the deactivation may be carried out at about room temperature.

The charge material conducted to the present process generally contains from about 4 to 10 carbon atoms, preferably from about 4 to 6 carbon atoms and may be a mixture of normal aliphatic hydrocarbons, isoaliphatic hydrocarbons and cyclic hydrocarbons. The normal aliphatic hydrocarbons may be normal paraffins or normal olefins or a mixture of the two. Iso-aliphatic hydrocarbons may be iso-paraffins or iso-olefins or a mixture of the two. Cyclic hydrocarbons include naphthenes or aromatics or a mixture of the two. It will thus be apparent that the charge material may be a relatively simple hydrocarbon mixture or a complex mixture of hydrocarbons which may contain minor proportions of other materials such as sulfur, nitrogen and oxygen-containing compenents. Representative of the latter type mixtures is petroleum and various fractions thereof. A preferred feed material comprises a $C_5$ hydrocarbon fraction having a boiling range from about 65° F. to about 115° F. This feed may be obtained from the catalytic cracking of a petroleum gas oil.

The contact of the charge with the zeolite structure having the catalytically active component within its pore structure and the substantially deactivated component on its outer surface, hereinafter referred to as solid adsorbent, is for a time sufficient to adsorb substantial quantities of the normal aliphatic hydrocarbons from the charge. During the adsorbing operation temperatures can be as high as about 550° F. Generally it will be between about 100 to 500° F., preferably about 300–475° F. Pressures can range from atmospheric or below up to about 1000 p.s.i.g. or even higher, preferably about atmospheric to about 800 p.s.i.g. Adsorbing can be conducted with part or all of the feed in the liquid phase. Vapor phase operation is also contemplated and in some instances is preferable. The catalyst can be used as a fixed, moving or fluidized bed or in any other convenient type of handling system; a fixed bed, non-cyclic operation is preferred in the process of the present invention. The space velocity generally will be from about 0.01 to 20, preferably from about 0.1 to 10 weights of feed per weight of solid adsorbent per hour (WHSV). Hydrogen is utilized in the present process in amounts ranging from the hydrogen to hydrocarbon molar ratio generally of about 0:1 to 20:1 or more, preferably about 1 to 20:1.

The adsorbed hydrogen treated normal paraffins are displaced from the solid adsorbent by the n-olefins and n-paraffins from the feed. The displaced normal paraffins which become mixed with the other feed components when they are displaced from the solid adsorbent can be recovered from the effluent by any of the known separation means, such as for instance, fractionation or even by using a molecular sieve type adsorbent which is selective for n-paraffins.

The practice of the present invention will be better understood by reference to the following examples which are illustrative only and not considered as limiting.

ing feed. In Examples II, III and IV, the deactivation of the platinum on the outer surface of the molecular sieve was conducted at operating conditions. In Example V, the catalyst was soaked in the sulfur containing feed at room temperature. Examples III and IV also show that the pressure controls the degree of hydrogenation and not the selectivity.

TABLE I

[Catalyst: 0.2% Pt on Linde 5A molecular sieve]

| Examples | Feed | I | II | III | IV | V |
|---|---|---|---|---|---|---|
| Conditions: | | | | | | |
| Temperature, °F | | 400 | 400 | 300 | 300 | 300 |
| Pressure, p.s.i.g | | 100 | 100 | Atm. | 30 | 100 |
| WHSV | | 0.5 | 0.5 | 0.4 | 0.4 | 0.5 |
| $H_2/H'C$ | | 4/1 | 4/1 | 4/1 | 4/1 | 4/1 |
| Catalyst poison | | | (¹) | (²) | (²) | (²) |
| Pentene Distribution: | | | | | | |
| Isopentane | 26.9 | 70.60 | 43.20 | 27.20 | 43.50 | 63.3 |
| n-Pentane | 5.9 | 26.95 | 22.70 | 16.00 | 20.00 | 34.1 |
| Pentene-1 and -2 | 24.3 | .64 | 4.89 | 19.23 | 7.21 | 0 |
| Isoamylenes | 41.4 | 1.61 | 29.11 | 37.63 | 29.28 | 2.6 |
| Wt. percent hydrogenation: | | | | | | |
| n-Pentanes | | 97.3 | 79.9 | 20.8 | 70.3 | 100 |
| Iso-pentenes | | 96.1 | 29.6 | 9.2 | 29.3 | 93.7 |
| n/Iso-hydrogenated | | 1 | 2.7 | 2.3 | 2.4 | 1 |

¹ 0.15% sulfur as thiophene is feed.
² Pretreated catalyst with 0.2% sulfur as thiophene in feed (30 ml. over 164 gms. catalyst).

PREPARATION OF THE CATALYST 3.56 grams of $H_2PtCl_6 \cdot H_2O$ (chloroplatinic acid) dissolved in 430 ml. of deionized water is stirred into 500 grams of zeolite crystalline pellets having a pore size of 5 angstrom units. The catalyst is then washed twice with deionized water to decrease the surface platinum concentration and calcined by heating to 925° F. in a flow of nitrogen gas followed by a flow of air while the composition is maintained at a temperature in the range of 865° F. to 920° F. for about 3 hours. The composition thus produced contains about 0.2 weight percent of platinum which is dispersed throughout the pore structure and on the outer surface of the zeolite crystalline base.

Example I

A catalyst consisting essentially of 0.2 weight percent of platinum on a Linde 5A Molecular Sieve prepared essentially as above was contacted with a $C_5$ hydrocarbon fraction having the composition analysis as reported in Table I below. The active hydrogenating metal on the surface of the molecular sieve was not deactivated either before contact with the feed or during the adsorption step. The adsorbed normal $C_5$ hydrocarbons were treated under the conditions specified in Table I. It will be observed that there is near quantitative hydrogenation of the normal pentenes as well as iso-pentenes.

Example II

A catalyst essentially the same as was used in Example I and containing 0.2 weight percent of platinum on a Linde 5A Molecular Sieve was contacted with a $C_5$ hydrocarbon fraction containing 0.15% thiophene in the feed. The adsorbed normal $C_5$ hydrocarbons were treated under the conditions specified in Table I. Approximately 80 weight percent of the normal pentenes were hydrogenated with a selectivity, normal olefin/iso-olefin, of 2.7.

Also presented in Table I are examples showing the effect of pretreating the catalyst of Examples I and II with thiophene (0.2% sulfur) in the $C_5$ hydrocarbon contain- It is claimed:

1. A process for selective hydrogenation of a straight chain olefin from a mixture of straight chain and branch chain olefins, which consists essentially of contacting said mixture under hydrogenation conditions with hydrogen, and a solid crystalline zeolite having a uniform pore size sufficiently large to admit said straight chain olefin, but sufficiently small to exclude said branch chain olefin, and containing a platinum hydrogenation component as the result of combining said solid crystalline zeolite having said uniform pore size with aqueous chloroplatinic acid and calcining the resulting composite at a temperature of about 750 to 1200° F., the external exposed surfaces of said zeolite having been poisoned with a poisoning compound of such molecular size and shape as to be excluded from entering the pores of the zeolite and making contact with said hydrogenation component on the interior thereof, and effecting catalytic hydrogenation of the straight chain olefin admitted to contact with said hydrogenation component to a hydrogenated product.

2. The process of claim 1 in which the crystalline zeolite has uniform pores of about 5 A. size.

3. A process for the selective hydrogenation of normal olefins in a mixture consisting essentially of normal olefins and non-straight chain olefinic hydrocarbons containing from 4 to 10 carbon atoms which comprises contacting said mixture with a solid adsorbent capable of selectively adsorbing normal aliphatic hydrocarbon components to the substantial exclusion of hydrocarbon components of larger molecular size under hydrogenation conditions and recovering a hydrogenation product consisting essentially of normal paraffins, said solid adsorbent comprising a crystalline zeolite having a uniform pore size and containing about 0.1 to 10 weight percent of a platinum hydrogenation component as the result of combining said solid crystalline zeolite having said uniform pore size with aqueous chloroplatinic acid and calcining the resulting composite at a temperature of about 750 to 1200° F., said solid adsorbent being contacted prior to the hydrogenation process with a hydrogenation deactivating compound in amounts sufficient to substantially deactivate the surface hydrogenation component and which will not be adsorbed into the pores of the said crystalline zeolite.

4. The process of claim 3 in which the crystalline zeolite has uniform pores of about 5 A. size.

5. The process of claim 4 wherein the hydrogenation deactivating compound is cyclic, and the cyclic compound contains a member of the group consisting of sulfur and nitrogen.

References Cited

UNITED STATES PATENTS 2,971,903  2/1961  Kimberlin et al. _____ 208—46
2,971,904  2/1961  Gladrow et al. _____ 208—46

DELBERT E. GANTZ, *Primary Examiner.*

SAMUEL P. JONES, *Assistant Examiner.*